INVENTOR
WILLIAM J. SHANAHAN
BY Cushman, Darby & Cushman
ATTORNEYS

INVENTOR
WILLIAM J. SHANAHAN
BY Cushman, Darby & Cushman
ATTORNEYS

INVENTOR
WILLIAM J. SHANAHAN
BY Cushman, Darby & Cushman
ATTORNEYS

1

2,969,533

CODING METHODS AND APPARATUS

William J. Shanahan, New York, N.Y., assignor to Skiatron Electronics & Television Corporation, New York, N.Y., a corporation of New York Filed Aug. 26, 1954, Ser. No. 452,428

9 Claims. (Cl. 340—347)

This invention relates to coding and particularly to methods and apparatus for establishing a maximum number of independent codes from a minimum number of input code controlling signals. Basically, the method and apparatus rely upon establishing a given code condition during a predetermined time period and utilizing that code condition in combination with a later supply of input code controlling signals to determine a code condition during a later time period.

It is a primary object of this invention to provide a new and improved code method and apparatus.

It is a further object of the invention to provide a coding method and apparatus for establishing a maximum number of independent codes from a minimum number of input code controlling signals.

Still further objects of the invention will be apparent from the following detailed description and appended claims.

The invention may be best understood with reference to the accompanying drawings, wherein.

Figure 1:
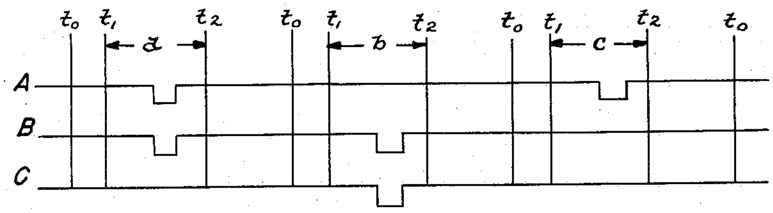
Figure 1 shows a chart of representative code controlling input signals.

To develop an explanation of the present invention, let it be assumed that a signal or the absence thereof is available on each one of a plurality of input lines, say three input lines, during each one of a series of repetitive time periods. With reference to Figure 1, which shows a time plot of signals from sources A, B and C, in time or code period *a*, suppose that a pulse moving negative from a relatively positive voltage represented by the horizontal A line exists at some time during the code period *a*, and similarly a pulse exists on line B, with no pulse on line C. In code period *b*, pulses exist on lines B and C but not on A. In code period *c* there is a pulse on A, but not on B or C, etc. It will be understool that in binary sense, with three input sources A, B and C it is possible to have a total of eight different signal conditions on the three lines. Assuming that the existence of a signal can be denoted by a 1 and the absence of a signal by a 0, the eight conditions may be represented by the following table:

*Table I*

| |
|---|
| 000 |
| 001 |
| 010 |
| 011 |
| 100 |
| 101 |
| 110 |
| 111 |

2

According to the present invention, methods and apparatus will now be described to show how with the same input condition, for example, binary combinations of signals from three sources A, B and C, an infinite number of independent codes, greater than eight, can be obtained.

Figure 2:
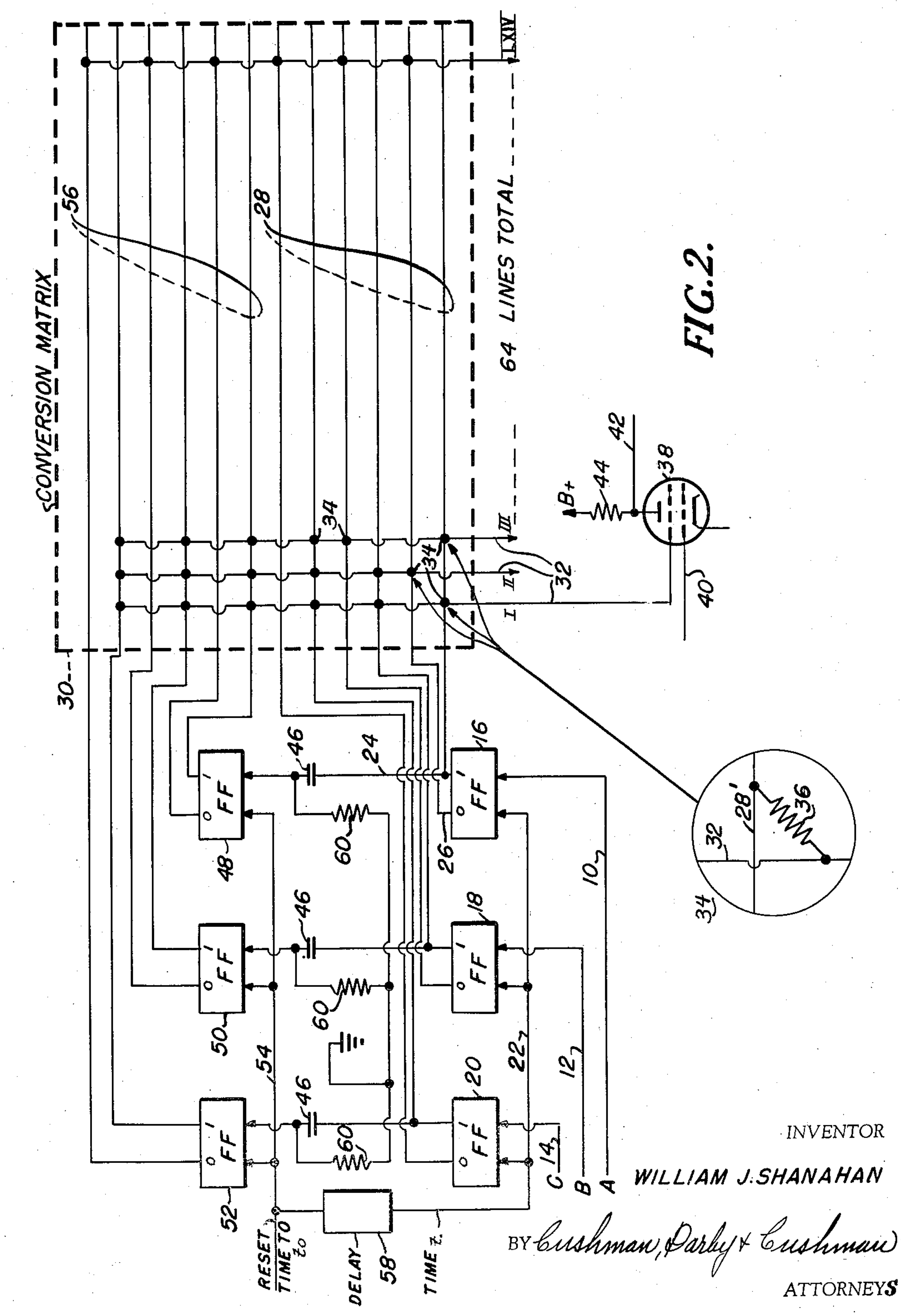
Figure 2 shows a circuit according to one embodiment of the invention.

Referring to Figure 2, input lines 10, 12 and 14 are provided for carrying signals from sources A, B and C, which signals for purposes of illustration may occur as explained above in connection with Figure 1. However, it will be understood that the signals may endure for the total of the code period, may be shorter and occur at random in different sub-time periods so that they do not overlap, etc. No limitation to particular signal forms is intended. It may, however, be understood that the circuit of Figure 2 operates with regard to time or code periods *a*, *b* and *c*, etc., as shown in Figure 1.

For purposes of illustration, flip-flop circuits 16, 18 and 20 are provided, each having as the righthand input, connection to lines 10, 12 and 14, respectively. The opposite or left-hand inputs are connected in common to line 22 which carries reset pulses, as will be described hereinbelow.

Flip-flop circuit 16 and all of the other flip-flop circuits mentioned herein may be of similar construction. It may be assumed that a negative input on one input line operates the flip-flop circuit to produce a relatively high potential on the output line aligned with the input line. Flip-flop 16 is provided with a right-hand output line 24 and a left-hand output line 26. A negative pulse on input line 10 will cause a shift to provide the relatively high potential on line 24 (unless it existed there previously). A negative pulse on the opposite input line connected to line 22 will produce the relatively high potential on line 26 and the potential on line 24 will move to the relatively low potential. This function will be entirely understood by those skilled in the art and it is only thought necessary at this point to explain the diagrammatic outlay adopted in this application. It will, of course, be understood that flip-flop circuits may be adapted to receive positive input pulses and no limitation to only negative input pulses is intended.

The two outputs of each flip-flop 16, 18 and 20 are connected to a group of lines designated 28 which extend into a conversion matrix circuit included within dash line 30. At this pont it will be understood, assuming setting of the flip-flop circuits 16, 18 and 20 to their left-hand positions (high potential on the left-hand output), whatever occurrence of negative pulses A, B and C may have existed would have caused a certain array of relative potentials to appear on the various output lines in the group 28. A plurality of vertically extending lines 32 are connected in the conversion matrix 30 at pre-selected points represented by the dots 34 at certain cross-over points of the conductors. As shown in the magnification circle immediately below Figure 2, each dot in practice may be a connection including a high impedance resistor 36 connecting one of the lines 32 with one of the lines of group 28, here designated 28'.

Each of lines 32 is further designated by Roman numbers I, II, III, etc., with it being understood that insofar as the outputs of flip-flops 16, 18 and 20 are concerned (without regard to other components of Figure 2) a total of eight lines may be employed and only one of the eight lines will carry a potential in a predetermined maximum range for ever situation of the flip-flops 16, 18 and 20. It will be understood that the matrix operates upon the principle that where every horizontal line to which a vertical line is connected (as by means of a high impedance resistor 36) is relatively positive, the vertical line 32 will be at that positive potential. Similarly, where every horizontal line is at the relatively low flip-flop output potential, the vertical line will be at that low potential. However, whenever one or more of the lines is relatively positive, and one or more of the lines is relatively negative, the potential of line 32 will be at some level between the maximum and the minimum potentials due to voltage divider action of the resistors 36.

If it be assumed that each of the lines 32 is connected as one input to a gate tube 38 (shown connected to line I, for example) the gate may be arranged to operate only when the potential of line I is in the maximum range rather than in one of the lower ranges. The gate tube 38 may be provided with a second input 40 which may carry any type of signal which is to be gated through when line I is thus "enabled." The gate may operate as is conventional, by an output on line 42 connected to the anode of the gate tube which is otherwise connected through a load resistor 44 to a source of B+.

Considering only flip-flops 16, 18 and 20, the number of output codes on the lines of group 28 is as described in connection with Figure 1 and Table I.

Continuing to refer to Figure 2, the right-hand outputs of flip-flops 16, 18 and 20, which may also be conveniently termed the "1" outputs, are further connected through capacitors 46 to serve as the right-hand or "1" inputs to additional flip-flops 48, 50 and 52, respectively. The opposite or left-hand inputs of flip-flops 48, 50 and 52 are connected in common to line 54 which carries a reset pulse which will be described. The outputs of flip-flops 48, 50 and 52 are connected to a second group of lines 56 in the conversion matrix circuit within dash line 30. The lines of groups 56, and those of group 28, may be conveniently termed memory output lines. The vertical lines 32 are extended and also connected to the lines in group 56 by means of high impedance resistors 36. There are now a total of twelve horizontal lines in the conversion matrix and to complete the total number of binary connections according to the following table (Table II), there will be a total of sixty-four of the vertical lines 32.

*Table II*

000000
000001
000010
000011
000100 etc.

It may be assumed that a reset pulse may appear on line 54 at times $t_0$ and this pulse will shift the flip-flop circuits 48, 50 and 52 so that the relatively high potential is the left-hand or "0" output line thereof. An instant later, at time $t_1$ a pulse may appear on line 22 (see Figure 1 for examples of $t_0$ and $t_1$). This pulse may conveniently be derived from the reset pulse on line 54 by applying same to a delay circuit 58. The effect of the pulse on line 22 is to shift to the 0 state whichever of flip-flops 16, 18 and 20 are not previously in that state. Whichever of these flip-flops shift from the 1 state to the 0 state, causes a drop in potential in the right-hand or 1 outputs, which produces a negative pulse on the right-hand input lines of flip-flops 48, 50 and 52. Resistors 60 are shown connected with capacitors 46 to suggest a typical differentiation circuit for providing the negative pulse to the right-hand inputs of flip-flops 48, 50 and 52. It will be recalled that the flip-flops 48, 50 and 52 had been reset at time $t_0$ to their 0 states and one or more of them may be shifted to their 1 states, depending upon any shift in flip-flops 16, 18 and 20 in response to signals on lines 10, 12 and 14. Thus, immediately after time $t_1$, the flip-flops 48, 50 and 52 represent the previous status of flip-flops 16, 18 and 20. Now, the signals A, B and C may proceed to set up a new condition of flip-flops 16, 18 and 20. As soon as this is completed, say at time $t_2$ (Fig. 1) a given one of the sixty-four output lines 32 will carry the relatively high voltage for enabling a gate tube 38 and all of the other sixty-three lines will be at a lower potential such as to disable its connected gate 38. Whatever type of signal may be applied to line 40 will thus be passed through the enabled gate 38, but blocked from the others. After time $t_2$, until the recurrence of time $t_0$, the sampling may function through the selected one of gates 38.

The preceding description of Figure 2 shows the output code condition based upon the current condition of flip-flops 16, 18 and 20 and the record or memory of the previous code period in flip-flops 48, 50 and 52. However, it will be apparent that the respective flip-flops may represent a code condition during a much earlier code period.

It will be understood that further banks of flip-flops may have inputs connected to one another in cascade. That is, a set of three additional flip-flops could be connected to have one input thereof connected to the right-hand or 1 outputs of flip-flops 48, 50 and 52 and the conversion matrix augmented accordingly. Thus, there are an indefinite number of independent codes which may be established, all based upon but three input signals A, B and C.

It will further be apparent that with only two input signals, say A and B, but with a cascading of flip-flop banks, a great number of independent codes is possible with the minimum number of input signals. It is entirely possible to operate with but one input signal which has been on during some code periods and off during others. By building up a history in accordance with the invention even this one input signal provides a great number of independent codes.

Figure 3:
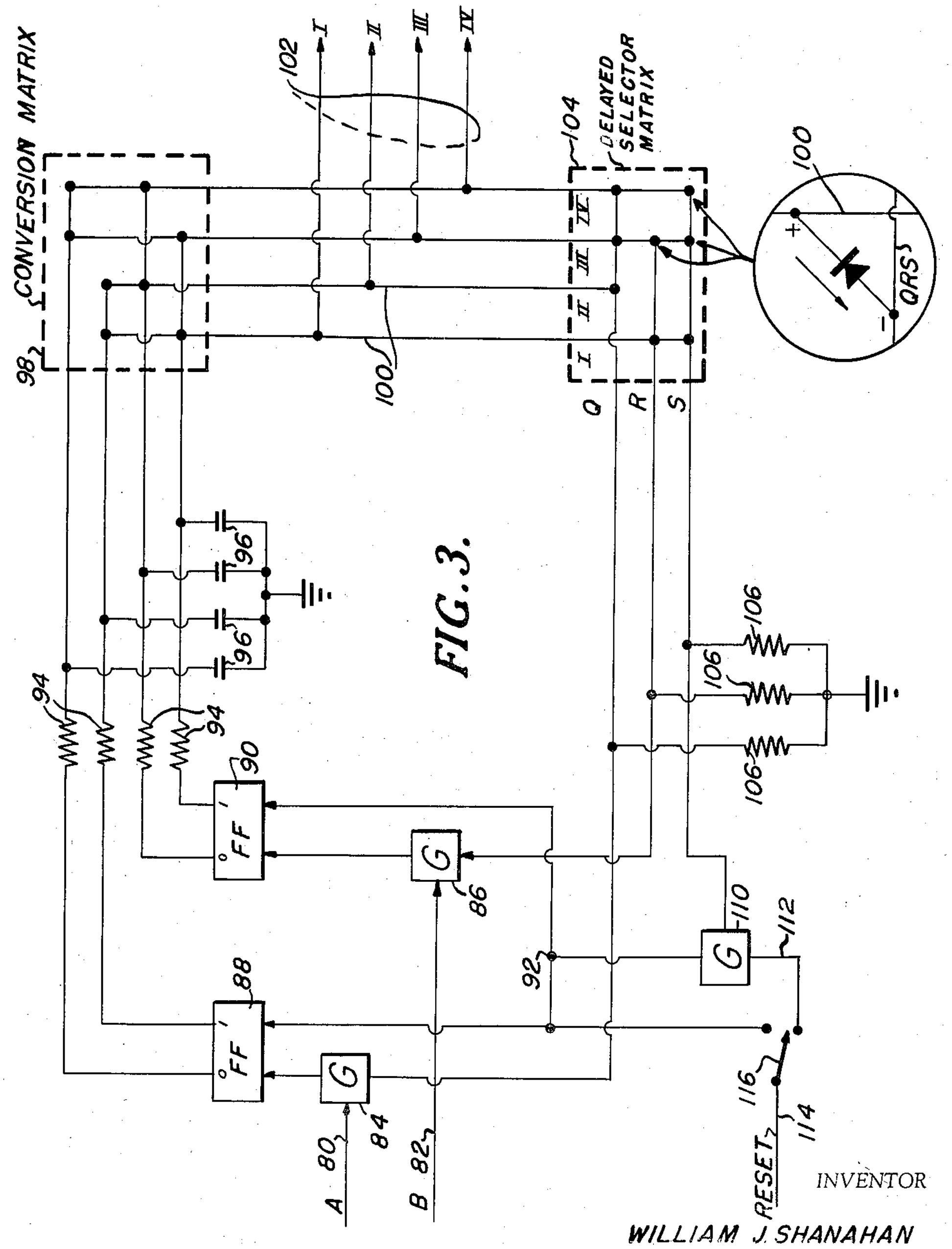
Figure 3 shows a circuit according to a second embodiment of the invention.

There are a great many specific circuits for carrying out the method of the present invention. Another embodiment is shown in Figure 3. Here input line 80 carries the A signals and input line 82 carries the B signals. Line 80 is connected to one of two enabling inputs of gate circuit 84 and line 82 is connected as one of two enabling inputs to gate circuit 86. These gate circuits may be of the conventional vacuum tube variety such as shown by tube 38 in Figure 2 or any other suitable circuit. The output of gate 84 serves as the left-hand input to a flip-flop or memory circuit 88 and the output of gate 86 serves as the left-hand input to flip-flop circuit 90. The right-hand inputs to flip-flops 88 and 90 are connected in common to line 92 for reset purposes.

After the possibility of signals A and B has passed, this following the period of a reset pulse on line 92, the four output lines of flip-flop circuits 88 and 90 will assume particular respective conditions. In each output there is an integration circuit consisting of a resistor 94 and a capacitor 96. The capacitors 96 in each circuit will serve to retain a memory of the level of potential in each line, following the time when a reset pulse on line 92 has actually shifted the flip-flops 88 and 90 (assuming they were in a shiftable condition). The discharge times of the condensers 96 in consideration of the remainder of the circuitry may be such as to hold this memory well through the next code period, including the sampling period $t_2$ to the next $t_0$. During this time a conversion matrix circuit included within dash line 98 will have enabled one and only one of four vertically extending output lines 100, all as described with regard to the circuit of Figure 2, each dot in the conversion matrix being a high impedance resistor 36 or similar arrangement. The output of the conversion matrix may be tapped off on the lines of group 102 for selective gating purposes, as described with regard to gate tube 38 in Figure 2. However, the lines 100 further extend into a delayed selector matrix within dash line 104. In this matrix the four vertical lines I, II, III and IV are connected in predetermined manner as denoted by the large dots therein to horizontally extending lines Q, R and, if desired, line S. As represented by the magnification circle, the dots in this selector matrix may be diodes operating according to the convention there expressed of current flow from positive to negative when the representative connections to the diode are relatively positive and negative. When line I is in its highest potential range, conduction through a diode at the junction with line R will cause current flow through a resistor 106 to move the line R positive sufficient to enable gate 86 but to continue conduction through the diode. The provision of the diode at each junction prevents the completion of a "sneak" circuit to the line Q (continuing the given example) so as to enable gate 84. That is, there will be no conduction through the diode at the intersection of line III and line R to permit the line R now at a relatively positive potential to raise the line Q to a positive potential. Similar resistors 106 are also connected to lines Q and S for the same purpose.

Considering now lines Q and R, it will be apparent that voltages held over by capacitors 96 from a previous code period may or may not close one or both of gates 84 and 86 during the time period of possible occurrence of signals A and B. Thus, during a given sampling interval of a code period the status of the voltages on the conversion matrix output line 100 reflects the input code signal control condition during more than one code period.

In greater detail, the resistors 94 may be, for example, one megohm resistors and the condenser 96 may be approximately .01 mfd. This combination can charge up to approximately peak value in 1/60 second, but will hold the charge for a good percentage of the ensuing 1/60 second.

Continuing to refer to Figure 3, an additional gate 110 may be added having as one input the line S and having as a second input a line 112 connectable to a source of reset pulses available on line 114. It may be mentioned at this point that line 114 is normally connected to line 92 via switch 116. If switch 116 is now set to connect lines 112 and 114, even the reset pulses will be applied to the flip-flop circuits 88 and 90 only at such times as there is no connection made between the selected one of the conversion matrix output lines 100 and the line S, in the delayed selector matrix within chain line 104. It will be immediately apparent that a staggering number of possible independent codes is available in this manner.

With regard to the circuit of Figure 3, only two inputs A and B have been shown in order to reduce the complexity of the circuit for purposes of explanation. However, it will be again understood that flip-flop banks may be cascaded for increasing the number of conversion matrix output lines 100, all as discussed in connection with Figure 2.

It is interesting that the circuits according to this invention quickly come into step regardless of a particular situation which may exist when the operation is started. The following table (Table III) is produced to indicate a typical sequence of events which may occur as the system is set into operation. Basing an illustration on the circuit of Figure 3 without limitation, the first two left-hand columns in Table III represent an arbitrary sequence of pulses A and B within code periods, the third and fourth columns represent the conditions existing in flip-flops 88 and 90, and the fifth and sixth columns indicate the conditions of gates 84 and 86. (Table III assumes that gate 110 is not connected.) In Table III in the left-hand columns a 1 indicates the existence of a pulse of proper polarity to trigger the flip-flops and a 0 indicates the absence of such pulse. In the flip-flop columns 1 indicates a relatively high potential on the right-hand output and 0 indicates a relatively high potential on the left-hand output. In the right-hand columns the word "open" indicates that the gate is in condition to allow a pulse of proper polarity to be transmitted to trigger the flip-flops.

*Table III*

| A | B | FF88 | FF90 | G84 | G86 |
|---|---|---|---|---|---|
| | | 0 | 0 | Open | Closed. |
| 1 | 1 | 0 | 1 | Open | Open. |
| 0 | 1 | 1 | 0 | Open | Closed. |
| 0 | 0 | 1 | 1 | Closed | Open. |
| 1 | 1 | 1 | 0 | Open | Closed. |
| 1 | 0 | 0 | 1 | Open | Open. |
| 0 | 1 | 1 | 0 | Open | Closed. |
| 0 | 1 | 1 | 1 | Closed | Open. |
| 1 | 0 | 1 | 1 | Closed | Open. |
| 0 | 1 | 1 | 0 | Open | Closed. |
| 1 | 1 | 0 | 1 | Open | Open. |
| 1 | 0 | 0 | 1 | Open | Open. |
| 0 | 1 | 1 | 0 | Open | Closed. |
| 1 | 0 | 0 | 1 | Open | Open. |
| 0 | 1 | 1 | 0 | Open | Closed. |

"Open" indicates that the gate allows pulses be transmitted.

It will be noted that Table III is predicated on the assumption that flip-flops 88 and 90 are initially in states 0 and 0, respectively. The following table (Table IV) is included to show what will happen if tha flip-flop 88 is initially in state 0 and the flip-flop 90 in state 1.

*Table IV*

| A | B | FF88 | FF90 | G84 | G86 |
|---|---|---|---|---|---|
| | | 0 | 1 | Open | Open. |
| 1 | 1 | 0 | 0 | Open | Closed. |
| 0 | 1 | 1 | 1 | Closed | Open. |
| 0 | 0 | 1 | 1 | Closed | Open. |

It will be noted that by the time the third pulse has arrived the system is in step and Tables III and IV correspond. If flip-flop 88 is initially in its 1 state and flip-flop 90 is initially in its 0 state, the following table (Table V) shows the cycle coming into synchronization.

*Table V*

| A | B | FF88 | FF90 | G84 | G86 |
|---|---|---|---|---|---|
| | | 1 | 0 | Open | Closed. |
| 1 | 1 | 0 | 1 | Open | Open. |
| 0 | 1 | 1 | 0 | Open | Closed. |

In any combination the system will come into synchronization within a few fields.

Figure 4:
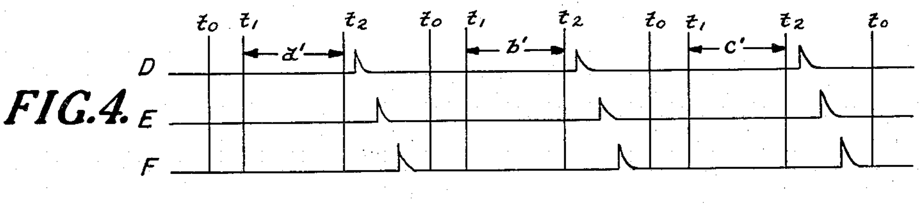
Figure 4 shows a chart of representative signals to be selectively gated.
Figure 5:
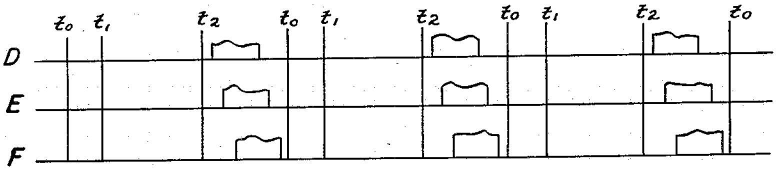
Figure 5 shows a chart of still other representative signals to be selectively gated.

The code circuits according to the present invention will find many uses. One use may be for controlling the selection of one or more of a plurality of different signals for a given use. For example, now referring to Figure 4, let it be assumed that during given time periods *a'*, *b'*, etc., there may be available from sources D, E and F pulses which occur at different time instants within said time periods. These pulses may be for use in electrical apparatus which is to be responsive to pulses at different times within time periods. Or, referring to Figure 5, there may be trains of signals which are similar in nature but delayed respectively to begin at differing times.

Specific use of the circuits may be in scrambled television transmission systems as represented, for example, in my copending application Serial No. 316,485, filed October 23, 1952, and Serial No. 418,642, filed March 25, 1954.

Figure 6:
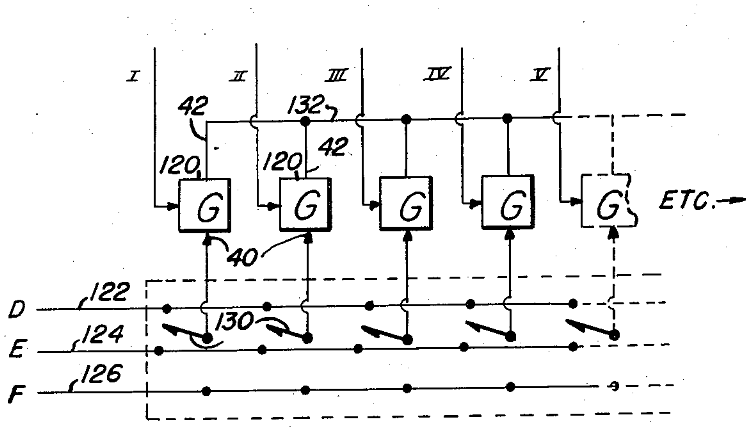
Figure 6 shows an array of gating means for use with the circuits of Figures 2 and 3 and equivalents thereof.

The circuits of Figures 2 and 3 may be connected to have the conversion matrix output lines 32 (Fig. 2) or 100 (Fig. 3) (otherwise designated by Roman numbers I, II, III, etc.) as inputs to gates 120 as shown in Figure 6. (Gates 120 may include the gate tubes 38 of Figure 2.) The pulses from sources D, E and F, of whatever character they may be, may be applied to lines 122, 124 and 126, respectively, these lines being part of a switching matrix shown within dash line 128 in Figure 6. A switch 130 may be provided and connected as the second input 40 to gates 120, the switch having possible contact with each of lines 122, 124 and 126 all as shown in Figure 6. The outputs of the gates 120 may be collected on a common line 132 collecting the gate output lines 42 (Fig. 2) which may be otherwise connected to the final equipment (not shown) for utilizing the D, E and F signals.

In operation, as hereinabove described, one of the lines I, II, etc. will have a gate enabling signal thereon for a predetermined code condition as determined by the earlier part of the circuitry. Thus, one of the gates 120 will be opened, permitting signals from whichever one of lines 122, 124 or 126 happens to be connected through the associated switch 130 to serve as the second input to the particular gate which is otherwise enabled. It will be apparent that after one has set up the switches 130 in a predetermined manner an additional coding function is added to the remainder of the circuitry. That is, enabling of line I may gate signals from source D, source E or source F depending on the setting of the switch 130.

The foregoing detailed description of illustrative embodiments of the invention has been given only for purposes of illustration, and the scope of the invention is to be determined from the appended claims.

What is claimed is:

1. Apparatus capable of establishing $2^{xn}$ different codes in a like number of code periods in each of which *n* input code controlling signals are received comprising a first set of *n* memory means for respectively receiving said signals and for remembering same during one code period, at least one other set of *n* memory means respectively coupled to said first memory means for receiving outputs therefrom and thereby remembering the respective *n* input signals received by the first memory means during said one code period at least until said first memory means receives input signals in a successive code period regardless of the presence or absence of one or more of the *n* input signals in said successive code period, there being *x* number of memory means sets, and matrix means having a plurality of output lines variously coupled within the matrix to the first and other set of memory means, the arrangement being such that the combination of signals occurring on said output lines during a given portion of any code period is representative of one of said $2^{xn}$ different codes and is based on the *n* input signals received during more than one code period.

2. Coding apparatus capable of establishing a plurality of different codes in a like number of discrete code periods defined by regularly recurring spaced timing pulses with each code period including a plurality of input code controlling signals which are randomly on and off comprising a plurality of flip-flops each having two setting inputs and two outputs, means for coupling said flip-flops at one of the inputs of each respectively to sources of said input signals whereby each flip-flop receiving an on input signal is set to a first stable state, means for coupling the other input of each of the flip-flops to a source of said timing pulses for setting each flip-flop to a second stable state when a timing pulse is received thereby, a plurality of two-state memory means corresponding in number to and associated respectively with flip-flops, each two-state memory means including two devices which are simultaneously in opposite states and each of which have an input and an output, a signal conversion matrix having a plurality of input and output lines and impedance means variously interconnecting the input and output lines so that no one output line is connected to the same input lines as another output line, means for coupling flip-flop outputs to corresponding inputs of said two-state memory means and for coupling all the outputs of the flip-flops and two-state memory means to the input lines of said matrix, the arrangement being such that the state of each two-state memory means during at least part of a given code period corresponds to the state of its respective flip-flop during the immediately preceding code period whether the flip-flop receives an on or off signal during said given code period whereby the combination of signals occurring on the matrix output lines during a given portion of any code period is representative of one of said plurality of different codes with each such code being based on the input signals received during at least two successive code periods.

3. Coding apparatus as in claim 2 wherein said plurality of two-state memory means is a second group of flip-flops one as each two-state memory means, one of the inputs of each of the flip-flops in the second group thereof being connected to receive said timing pulses and the other input of each such flip-flop being coupled to the corresponding output of one of the first mentioned flip-flops, the means for coupling the said other input of each of the first mentioned flip-flops to receive said timing pulses including a delay element whereby each of the first mentioned flip-flops is reset to its second stable state at a time between the receipt by the second group of flip-flops of a timing pulse and the receipt by the first mentioned flip-flops of said input signals.

4. Coding apparatus as in claim 3 wherein each matrix output line has connected thereto gating means for gating a signal from a signal source.

5. Apparatus as in claim 4 and further including a common output line coupled to each of the gating means, said source supplying a plurality of time displaced signals coupled to the gating means whereby one of the gating means gates a time displaced signal to said common output line only if coupled thereto while being enabled by said enabling signal.

6. Coding apparatus as in claim 2 wherein each of the devices in each of said two-state memory means is an integrator, the inputs of all the integrators being respectively coupled to the outputs of said flip-flops, wherein the means for coupling the sources of input signals respectively to said flip-flops each includes gating means, and wherein the apparatus includes selector means coupled to said matrix output lines for selectively enabling said gating means in accordance with at least certain of the outputs from said matrix.

7. Coding apparatus as in claim 6 wherein the means for coupling the said other input of each of the flip-flops to a source of timing pulses includes other gating means selectively enabled by said selector means in accordance with at least certain of the outputs on the matrix output lines.

8. Coding apparatus as in claim 7 wherein each matrix output line has connected thereto gating means for gating a signal from a signal source.

9. Apparatus as in claim 8 and further including a common output line coupled to each of the gating means, said source supplying a plurality of time displaced signals coupled to the gating means whereby one of the gating means gates a time displaced signal to said common output line only if coupled thereto while being enabled by said enabling signal.

References Cited in the file of this patent

UNITED STATES PATENTS

| | | |
|---|---|---|
| 2,248,820 | Haselton | July 8, 1941 |
| 2,403,561 | Smith | July 9, 1946 |
| 2,517,102 | Flory | Aug. 1, 1950 |
| 2,517,587 | Mohr | Aug. 8, 1950 |
| 2,570,716 | Rochester | Oct. 9, 1951 |
| 2,577,141 | Mauchly | Dec. 4, 1951 |
| 2,590,950 | Eckert | Apr. 1, 1952 |
| 2,634,052 | Bloch | Apr. 7, 1953 |
| 2,635,229 | Gloess et al. | Apr. 14, 1953 |
| 2,667,633 | Mandel | Jan. 26, 1954 |
| 2,673,936 | Harris | Mar. 30, 1954 |
| 2,686,299 | Eckert | Aug. 10, 1954 |
| 2,707,591 | May | May 3, 1955 |
| 2,731,631 | Spaulding | Jan. 17, 1956 |
| 2,740,949 | Counihan et al. | Apr. 3, 1956 |
| 2,772,399 | Jacobsen | Nov. 27, 1956 |
| 2,807,002 | Cherin | Sept. 17, 1957 |